(12) United States Patent  
Patzak et al.

(10) Patent No.: US 11,451,118 B2
(45) Date of Patent: Sep. 20, 2022

(54) CONDUCTOR ARRANGEMENT AND TRANSPORTABLE ELECTRICAL DRIVE DEVICE

(71) Applicants: MOLABO GmbH, Ottobrunn (DE); Universitaet der Bundeswehr Muenchen, Neubiberg (DE)

(72) Inventors: Adrian Patzak, Munich (DE); Florian Bachheibl, Munich (DE); Gurakuq Dajaku, Neubiberg (DE)

(73) Assignees: MOLABO GmbH, Ottobrunn (DE); UNIVERSITAET DER BUNDESWEHR MUENCHEN, Neubiberg (DE)

( * ) Notice: Subject to any disclaimer, the term of this patent is extended or adjusted under 35 U.S.C. 154(b) by 471 days.

(21) Appl. No.: 16/095,933

(22) PCT Filed: Apr. 26, 2017

(86) PCT No.: PCT/EP2017/059953
§ 371 (c)(1),
(2) Date: Oct. 23, 2018

(87) PCT Pub. No.: WO2017/186803
PCT Pub. Date: Nov. 2, 2017

(65) Prior Publication Data
US 2019/0140525 A1 May 9, 2019

(30) Foreign Application Priority Data
Apr. 28, 2016 (DE) .......................... 102016107937.5

(51) Int. Cl.
*H02P 1/00* (2006.01)
*H02K 11/33* (2016.01)
(Continued)

(52) U.S. Cl.
CPC .............. *H02K 11/33* (2016.01); *B60L 50/50* (2019.02); *H01M 10/0413* (2013.01);
(Continued)

(58) Field of Classification Search
CPC .............. B60L 50/50; H01M 10/0413; H01M 2220/20; H01M 2/1083; H01M 2/20; H01M 2/30; H02K 11/33; H02K 5/225
(Continued)

(56) References Cited

U.S. PATENT DOCUMENTS 5,408,049 A   4/1995   Gale et al.
5,466,998 A   11/1995  Kinoshita et al.
(Continued)

FOREIGN PATENT DOCUMENTS

CN   202678487 U   1/2013
CN   204597001 U   8/2015
(Continued)

OTHER PUBLICATIONS https://www.fmcsa.dot.gov/sites/fmcsa.dot.gov/files/docs/mission/training/82561/electric-vehicle-manuscript-final2.pdf, EnDyna Instructional Design Staff and M.J. Bradley & Associates LLC (Year: 2017).*

(Continued)

*Primary Examiner* — Kawing Chan
*Assistant Examiner* — Gabriel Agared
(74) *Attorney, Agent, or Firm* — Morgan, Lewis & Bockius LLP

(57) ABSTRACT

The invention relates to a conductor assembly for transmitting electrical power in a mobile system, in particular in a land, air or water vehicle, comprising an inner conductor (1) and an outer conductor (3) coaxially arranged thereto, which are electrically insulated from each other by means of an insulation layer (2).

19 Claims, 16 Drawing Sheets

(51) Int. Cl.
*H01M 10/04* (2006.01)
*H02K 5/22* (2006.01)
*B60L 50/50* (2019.01)
*H01M 50/20* (2021.01)
*H01M 50/50* (2021.01)
*H01M 50/543* (2021.01)

(52) U.S. Cl.
CPC ........... *H01M 50/20* (2021.01); *H01M 50/50* (2021.01); *H01M 50/543* (2021.01); *H02K 5/225* (2013.01); *H01M 2220/20* (2013.01); *Y02T 10/64* (2013.01); *Y02T 10/70* (2013.01)

(58) Field of Classification Search
USPC ........................................................ 318/139
See application file for complete search history.

(56) References Cited

U.S. PATENT DOCUMENTS

| | | |
|---|---|---|
| 5,591,937 A | 1/1997 | Woody et al. |
| 5,670,860 A | 9/1997 | Conrady et al. |
| 5,684,380 A | 11/1997 | Woody et al. |
| 2006/0180111 A1 | 8/2006 | Stevens et al. |
| 2012/0181059 A1* | 7/2012 | Radermacher .......... B60L 53/18 174/115 |
| 2015/0083459 A1 | 3/2015 | Nagahashi |
| 2015/0212140 A1* | 7/2015 | Lawrence .............. G01R 31/52 324/509 |
| 2016/0036296 A1 | 2/2016 | Kabune |
| 2017/0047804 A1 | 2/2017 | Dajaku |

FOREIGN PATENT DOCUMENTS

| | | |
|---|---|---|
| DE | 69701022 T2 | 5/2000 |
| DE | 69627246 T2 | 1/2004 |
| DE | 102014105642 A1 | 10/2015 |
| DE | 102015214463 A1 | 2/2016 |
| EP | 0823766 A1 | 11/1998 |
| EP | 2112744 A1 | 10/2009 |
| WO | 03012460 A2 | 2/2003 |
| WO | 2011011776 A1 | 1/2011 |

OTHER PUBLICATIONS

Chinese Office Action from Chinese Patent Application No. 201780026425.1, dated Oct. 11, 2021, 10 pages including English language translation.

* cited by examiner

CONDUCTOR ARRANGEMENT AND TRANSPORTABLE ELECTRICAL DRIVE DEVICE

The present invention relates to a conductor arrangement for transmitting electrical energy in a transportable system, in particular a land vehicle, aircraft, or watercraft. The present invention further relates to a transportable electrical drive device having the conductor arrangement.

For example, in electrically powered motor vehicles, high electrical power must be transferred between a source of electrical energy, such as a battery, a flow battery, or a fuel cell, and a sink of electrical energy, such as an electric motor. Such drive motors often have nominal power of 100 kW or greater, so that operating voltages of several hundred volts and operating current of several hundred amperes occur.

When high voltages occur in a motor vehicle, special protective measures must be taken for the passengers. This applies particularly in the case of deformation of the chassis, such as in an accident. A greater level of insulation for parts under voltage is associated with said case.

The transmission of high currents typically causes strong magnetic fields that must be shielded at great effort so that no undesired interaction with other electrical devices in the vehicle occurs, such as electronic circuits of the vehicle electronics.

The object of the present invention is to produce an improved option for transmitting electrical energy, particularly in a drivetrain of a motor vehicle.

Said object is achieved by the objects of the independent claims. Advantageous embodiments and refinements are disclosed in the dependent claims.

In one embodiment, a conductor arrangement is provided for transferring electrical energy in a transportable system, in particular a land vehicle, aircraft, or watercraft, comprising an inner conductor and an outer conductor disposed coaxially thereto, said conductors being insulated from each other by an insulating layer.

The coaxial construction of the conductor means that the space around the conductor is nearly free of fields, particularly free of magnetic fields, even in the case that high currents of several hundred amperes or even several kiloamperes are transmitted, for example.

Said coaxial construction further allows the nominal voltage to be reduced, for example to 60 volts or less, as the higher currents occurring as a counterpart with identical power require practically no shielding measures.

In one embodiment, the conductor arrangement is designed for a DC voltage of <1000 V between the inner and outer conductor.

In another embodiment, the conductor arrangement is designed for a DC voltage between the inner and outer conductor in an interval from 1 to 60 V. The insulating layer is particularly designed for said DC voltage range.

Voltages in the latter interval are often referred to as safety extra-low voltage. This means that contact with parts under voltage by persons is not associated with hazards to life and limb. Thus no special protective measures need to be taken to prevent contact with parts under voltage.

This is particularly advantageous when using the proposed conductor arrangement in transportable drive devices, such as in motor vehicles, aircraft, or watercraft.

In a refinement of the proposed principle, the inner conductor of the conductor arrangement has a cavity for receiving a coolant. Particularly for current levels of several hundred amperes or a few kiloamperes, such as are not uncommon in electrically powered vehicles for the voltage ranges indicated, it can be advantageous to cool the conductor arrangement itself and/or to transport a cooling medium to a connected battery and/or a connected electric motor in order to extract heat losses or, particularly in the case of the battery, to maintain a predefined temperature range.

Alternatively, a further insulator can be provided in the interior of the inner conductor instead of the cavity.

The conductor arrangement is preferably connected between a battery and a drive motor in order to supply the drive motor with electrical energy from the battery. The drive motor preferably comprises a rectifier having power electronics. In that case the conductor arrangement is connected between the battery and the rectifier.

Conversely, in a generator mode of the electric motor, the battery can be charged by means of the conductor arrangement, such as during regenerative braking.

In order to allow tight bending radii, the inner conductor and/or the outer conductor can comprise a flexible metal structure. For example, braided structures and/or plaited network structures can be used.

It is thereby also possible to bring about conversion of connections having different geometries. For example, the conductor arrangement can comprise a round, coaxial connection at one end and a rectangular, coaxial connection at the other end.

For insulating against other parts under voltage, for example, the outer conductor can be enclosed by a further insulating layer, preferably also coaxial in construction. The insulating layer can be cylindrical in shape.

In one embodiment, a transportable electrical drive device comprising a conductor arrangement as described above is provided. The transportable electrical drive device further comprises a battery and a drive motor. The conductor arrangement connects the battery to the drive motor for transmitting electrical energy for supplying the drive motor. The battery, drive motor, and conductor arrangement are thus part of a drivetrain, such as that of an electrically powered motor vehicle.

In a further embodiment, a circuit configuration is provided for feeding a drive motor designed as a multiphase electric machine. The circuit configuration can be encompassed by the drive device.

The circuit configuration comprises a circuit board having one connection each for a positive pole and a negative pole for connecting to a DC intermediate circuit voltage, at least one semiconductor power switch each mounted on the circuit board and connecting the positive and negative pole to an output connector, forming a half-bridge circuit, wherein the connections for the positive and negative poles and the output connection are each extensive in area and wherein the output connection is set up for providing a cycled voltage as an actuation signal for an electrical phase of the multiphase machine.

By means of the half-bridge circuit, either the positive pole or the negative pole is connected to the corresponding electrical phase of the machine. If a plurality of phases of the machine are each actuated by a proposed circuit configuration, then the plurality of circuit boards form a rectifier for actuating the machine.

The proposed circuit configuration allows a rectifier for actuating the electric machine to be constructed in a particularly space-saving manner.

The intermediate circuit can comprise at least one intermediate circuit capacitor connected between the connection for the positive pole and the connection for the negative pole of the circuit board. The intermediate circuit capacitor buffers the energy in the intermediate circuit and stabilizes the intermediate circuit voltage.

If a plurality of circuit boards are provided, then all positive poles of all circuit boards can be connected to each other. Furthermore, all negative poles of all circuit boards can be connected to each other.

One circuit board per phase of the electric machine is preferably provided, wherein the output connection of each circuit board is connected to the associated phase of the electric machine.

In one refinement, the electric machine comprises a stator having a plurality of slots, wherein one slot is provided for each phase of the machine and an electrically conductive bar extending in the axial direction is placed in each slot, wherein the bars are distributed about the circumference of the stator. The stator winding of the machine is implemented by means of the bars.

The construction is particularly space-saving if each circuit board is disposed at the end face on the stator in an axial extension of the associated bar.

The connections for the positive pole and the negative pole are preferably disposed adjacent to each other or one above the other relative to the plane of the board and are implemented extending flat in the axial and/or radial direction of the machine. A contact ring is preferably provided for short-circuiting all positive poles of the circuit boards to each other. A further contact ring is provided for short-circuiting the negative poles. The contact rings implement a DC bus.

All ends of the bars on the side of the stator opposite the circuit boards in the axial direction of the stator are preferably short-circuited to each other, for example by means of a short-circuit ring, similarly to a cage rotor.

In one refinement, the electrically conductive bar of the electric machine is implemented so as to directly contact the semiconductor power switch, so that the circuit board forms a unit with the electrically conductive bar. The electrically conductive bar of said unit can then be placed in a slot. All bars can then be connected to each other at one axial end of the machine by means of an electrically conductive short-circuiting means. At the other axial end, one contact ring each is mounted for short-circuiting each of the positive poles of the circuit boards to each other and the negative poles of the circuit boards to each other.

In another embodiment, a battery having a flat and extensive design is provided for a drive device, particularly of an electrically powered vehicle.

The battery comprises at least two electrically conductive plates disposed parallel to each other. Said plates are spaced apart and electrically separated by a flat insulator. A sandwich structure is thereby formed.

The sandwich structure can be the base plate of a rechargeable battery of an electrically powered motor vehicle. Said sandwich structure can both serve as a current conductor for the actual vehicle battery as well as store a small amount of energy itself. The base plate does not thereby implement the actual battery. Due to the sandwich construction, some electrical energy can be intermediately stored according to the principle of a plate capacitor.

Such a battery is based on the principle of a plate capacitor. In motor vehicles, for example, large cross sections must be used to obtain low transmission losses and effective shielding is needed. The proposed construction fulfills both requirements. The base plate of the battery is thus used as a conductor. The base plate is made of aluminum, for example. Said plate commonly serves for preventing foreign objects from entering the rechargeable battery.

According to the proposed principle, the base plate is divided into a plurality of plates glued or otherwise attached to the insulator. The insulator can serve to increase strength, for example. An aramide or carbon layer or a plurality of layers can thereby be placed between two aluminum plates, for example.

In one refinement, a further insulator is placed between one of the two plates and a third plate.

In this case, the center plate preferably forms one electrical pole, while the other pole is implemented by the other two plates, that is, the outer plates. For said construction, the center conductor is preferably twice as thick as the other two circuit boards.

An arbitrary number of additional layers each comprising one insulator and one plate can be used. In one embodiment, the insulator has a high relative permittivity.

The spacing between two plates is thereby preferably as small as possible, in order to achieve as great a capacitance as possible. Of course the spacing must be selected to be great enough that the breakdown field strength of the dielectric is not exceeded.

In another embodiment, a mutually engaging comb structure of plates lying upon each other is provided.

High-current contacts and busbar connections can be provided for charging the battery. Displaceable covers can be provided for protecting against dust and contamination in order to cover the high-current contacts or busbars when not in charging mode.

In another embodiment, a protective circuit configuration is provided and serves for tripping a fuse. The fuse is connected in series with a battery cell of a battery. Said battery is preferably provided in a drive device for an electric vehicle, such as an electrically powered motor vehicle or an electrically powered boat. The protective circuit configuration comprises a short-circuit switch connected in parallel with the series circuit comprising the battery cell and the fuse.

The proposed principle combines a passive fuse with active tripping in case of a fault.

The fuse can be implemented as a bond wire, for example. Said bond wire is sized such that when an impermissibly high overcurrent flows beyond a longer period of time, the bond wire fuses and thus breaks the connection between said battery cell and other cells or a DC bus.

The short-circuit switch can be a switch in the conventional sense or can be implemented by the power electronics in a motor connected to the battery, for example in a drive device. To this end, the half bridges in a rectifier present for controlling the motor can be used, for example the half bridges present on the circuit boards of a circuit configuration for feeding a drive motor described above. The two power switches in the circuit board can thereby be closed so that the short-circuit current flows directly between the positive pole and the negative pole, or alternately, so that the current flows through the motor. The short circuit is thus implemented by the stator winding of the machine.

All embodiments described above, or a selection thereof depending on the application, can be implemented in combination with each other in an electrically powered vehicle.

The proposed principle is explained in further detail below using drawings for a plurality of embodiment examples. Shown are:

FIG. 1 A first embodiment example of a conductor arrangement according to the proposed principle, FIG. 2 A second embodiment example of a conductor arrangement according to the proposed principle, FIG. 3 An embodiment example for inner conductors and/or outer conductors, FIG. 4 A further embodiment example for inner conductors and/or outer conductors, FIG. 5 A further embodiment example for inner conductors and/or outer conductors, FIG. 6 An embodiment example of a conductor arrangement according to the proposed principle, FIG. 7 An embodiment example of a conductor arrangement according to the proposed principle, FIG. 8 A further embodiment example of a conductor arrangement according to the proposed principle, FIG. 9 A detail of a further embodiment example of a conductor arrangement according to the proposed principle, FIG. 10 An embodiment example of a high-current contact for a battery according to the proposed principle, FIG. 11 A further embodiment example of a high-current contact for a battery according to the proposed principle, FIG. 12 A further embodiment example of a high-current contact for a battery according to the proposed principle, FIGS. 13 and 14 A further embodiment example of a high-current contact for a battery according to the proposed principle, FIG. 15 An embodiment example of a cover of a contact of a battery, FIGS. 16 and 17 Embodiment examples of a battery according to the proposed principle using detail views, FIG. 18 An embodiment example of a protective circuit configuration for tripping a fuse according to the proposed principle, FIG. 19 A further embodiment example of a protective circuit configuration for tripping a fuse according to the proposed principle, FIG. 20 A first embodiment example of a drive device according to the proposed principle, FIG. 21 A second embodiment example of a drive device according to the proposed principle, FIG. 22 A third embodiment example of a drive device according to the proposed principle, and FIG. 23 A fourth embodiment example of a drive device according to the proposed principle, FIG. 24 A refinement of the embodiment example from FIG. 8, FIG. 25 A refinement as an example of the embodiment example from FIG. 7, FIG. 26 A further example of a refinement of the embodiment example from FIG. 8, FIG. 27 An embodiment example of a circuit board plugged onto a bar, FIG. 28 An embodiment example of the connection of a circuit board having contact rings, FIG. 29 Another embodiment example of the mounting of the circuit board on contact rings, FIG. 30 A third embodiment example of the mounting of a circuit board on contact rings, FIG. 31 An embodiment example of the mounting of a circuit board on contact rings by means of contact pads, FIG. 32 A further embodiment example of the mounting of a circuit board on contact rings by means of contact pads, FIG. 33 A third embodiment example of the mounting of a circuit board on contact rings by means of contact pads, FIG. 34 An embodiment example of the mounting of the circuit board between contact rings, FIG. 35 An embodiment example of a comb structure of a base plate of a battery.

FIG. 1 shows an example embodiment of a conductor arrangement for transferring electrical energy in a transportable system, in particular in a land vehicle, aircraft, or watercraft. The conductor arrangement comprises an inner conductor 1 and an outer conductor 3 disposed coaxial thereto. The inner conductor 1 and the outer conductor 3 are insulated from each other by an insulating layer. Like the inner and outer conductor, said insulator is also cylindrical in shape. The outer conductor 3 is enclosed by a further cylindrical insulating layer 4.

The inner insulator 2 and the outer insulator 4 can comprise plastic, for example, preferably a thermoplast. Said insulators can be implemented as a network structure or flat and closed, for example.

The inner conductor 1 and the outer conductor 3 can comprise aluminum or copper, in pure form or as an alloy. The material can be solid or stranded. The strands can be implemented as a braided network structure, for example.

The exterior of the conductor arrangement is advantageously practically free of fields. This applies particularly when high currents are transmitted by means of the conductor arrangement, as is the case, for example, in an electrically powered motor vehicle in the drivetrain, that is, between the battery and the drive motor.

It is thereby possible to reduce the operating voltage for which the conductor arrangement is designed relative to previously typical voltages in the motor vehicle having an electrical drive, and as a counterpart to accept even higher current levels. This is because practically no shielding effort is necessary with the coaxial construction of the cable.

The conductor arrangement can be designed for a nominal DC voltage of <1000 V between the inner and outer conductor, for example.

In another embodiment, the conductor arrangement is designed for a nominal DC voltage between the inner and outer conductor in an interval from 1 to 60 V. Said voltage range is also referred to as safety extra-low voltage.

As shown in FIG. 1, the inner conductor 1 comprises a cylindrical cavity 5 for receiving a coolant. The coolant can be liquid or gaseous.

Alternatively, as shown in FIG. 2, the inner conductor can comprise no cavity. In all other matters, the embodiment of the conductor arrangement from FIG. 2 corresponds to that of FIG. 1 in construction and functionality.

FIG. 3 shows an embodiment example of a plaited network structure. Alternatively, said structure can be woven. The inner conductor 1 and/or the outer conductor 3 can be constructed having said plaited network structure of conductive material, such as aluminum or copper.

As can be seen from FIGS. 4 and 5, said plaited network structure of the conductors has the advantage that the network can be compressed or stretched in both the longitudinal and transverse directions. Said mesh can comprise a cylindrical shape, for example produced as tubes or rolled as a flat network.

FIG. 6 shows an embodiment example of a conductor arrangement having a plaited network structure for the inner conductor and outer conductor. The conductor arrangement has a coaxial round structure at one end 6 and a coaxial rectangular structure at the other end 7.

A transition from a coplanar to a coaxial connection interface of the conductor arrangement can be particularly advantageously used in the drivetrain of a motor vehicle, such as between the battery and the drive motor. The network structure is stretched at the outer radius 8 of the curved conductor arrangement, while the network structure is compressed at the inner radius 9. Because the drive motor and battery are commonly supported on body or chassis components supported displaceably to each other, the flexible construction of the conductor arrangement is also advantageous here.

FIG. 7 shows an embodiment of a circuit board 10 in a circuit configuration for feeding a drive motor designed as a multiphase electric machine. Preferably one circuit board is provided for actuating each phase of the multiphase electric machine.

The circuit board 10 comprises a board 13 and comprises flat mounted voltage connections thereon for a positive pole 11 and for a negative pole 12.

The connection for the positive pole 11 has a large area, as does the connection for the negative pole 12, wherein the connection for the positive pole is present on the top side of the board 13 and the connection for the negative pole is present on the bottom side of the board 13. Both connections are substantially rectangular in shape. The positive pole 11 and the negative pole 12 are used for connecting to an intermediate circuit voltage. An output connection 14 also has a large area and rectangular shape and is also provided for connecting to each connection of the corresponding phase of the machine.

In place of the board 13, a supporting plate or a printed circuit board (PCB) can be provided.

At least one semiconductor power switch, not shown here, is connected between the output connection 14 and the connection for the positive pole 11. At least one semiconductor power switch is further connected between the output connection 14 and the connection for the negative pole 12, also not shown here. The semiconductor power switches can preferably be mounted on the circuit board where the connection for the positive pole 11 and the output connection or the connection for the negative pole 12 and the output connection meet at slight spacing along a separating line 15 to the insulation.

The purpose of said circuit configuration is to connect either the positive potential or the negative potential of the positive or negative pole 11, 12 to the output connection 14 of the circuit and thus to one phase of the machine. The contact between the output connection and the phase of the machine can be provided via various types of connections, such as screws, splices, or solder. Attaching by means of electrically conductive adapter pads is also possible, said pads thereby being implemented having a straight or angled design. Said design serves for adapting to the mechanical interface of the machine.

One alternative embodiment of the circuit configuration is shown in FIG. 8. Unlike in FIG. 7, the positive pole and the negative pole 11, 12 are not disposed on opposite sides of the board 13, but rather adjacent to each other on the same side. The connection pads are thereby implemented such that the positive pole 11 and the negative pole 12 each cover one corner of the board 13, while the plate for contacting the output connection covers two corners of the board.

An intermediate circuit capacitor, not shown here, can be mounted at the separating location 16 between the positive pole 11 and the negative pole 12 running in a parallel straight line along the board 13. One semiconductor power switch, also not shown here, is mounted at each separating location 15 also running in a straight line between the positive pole 11 and the output connection 14 and between the negative pole 12 and the output connection 14.

The plates implementing the positive pole 11, the negative pole 12, and the output connection 14 can be made of aluminum or copper plates, for example, and be mounted on the electrically insulating base board 13 comprising plastic, for example.

In an alternative embodiment, as shown in FIG. 9, a sandwich structure comprising a plurality of thin, conductive layers each spaced apart by thin insulating layers is provided in place of each plate for implementing the current-carrying connections. The metal layers, such as copper layers, are electrically connected by means of interlayer connections and the current is thus divided. A conventional standard multilayer PCB can be used to this end.

FIG. 10 shows an embodiment example of high-current contacts for contacting the base plate of the battery.

To this end, the base plate comprises at least two contact bars mount on a sandwich structure comprising at least two conductive plates having insulators between the same and conductively connected to each of the plates of the base plate.

The high-current contact shown in FIG. 10 is offered by the manufacturer Druseidt and enables a disconnectable terminal contact for high current to the base plate of the battery. The contact shown in FIG. 10 is thereby present at least twice for each pole of the DC voltage for charging the battery and is fixedly connected to a charging station, for example. The contact can also be made by a displaceable ground-level connection at a charging station, or by autonomously parking a vehicle on a contact point comprising the high-current contacts.

Alternative high-current contacts from Ampac are shown in FIGS. 11 and 12 in an alternative example.

FIGS. 13 and 14 show an embodiment of the contacts from Multi-Contact, also to be used for contacting the base plate.

In a preferred embodiment, the high-current contacts are coated at least on the vehicle side. A corresponding coating can be provided on the contact bars below the base plate. Said coating can be produced by special anodization, for example. Alternatively or additionally, the electrical contact surfaces can be coated with copper, cupal, silver, tin, and/or gold in order to improve conductivity and increase corrosion resistance. A coating comprising graphite or carbon nanotubes can be used alternatively or additionally.

The charging station can comprise spray nozzles for applying contact grease to the contact surfaces.

FIG. 15 shows a protective cover for the contact bars of the base plate of the vehicle. This can be slidingly supported on the longitudinal axis of the vehicle. A lamellar seal present in the present embodiment is not visible. The parts are displaceable along the longitudinal axis of the vehicle, that is, along a diagonal from the top left to the bottom right in the present figure.

FIGS. 16 and 17 show details of a base plate of a rechargeable battery of an electrically powered vehicle having a proposed sandwich structure. Semicircular or round openings 20, 21 tapering down from the open side can be used for contacting the upper contact of the upper plate of the sandwich structure from the bottom of the vehicle.

Of course, a plurality of such contact openings can be provided in alternative embodiments in order to increase current-carrying capacity.

Alternatively, the geometric shape of the contact openings can be designed differently, for example as a polygon or elongated hole.

FIG. 18 shows an embodiment example of a protective circuit configuration for tripping a fuse 30 connected in series with a battery cell 31. The battery cell 31 is part of a battery or a rechargeable battery of an electrically powered motor vehicle, for example. A short-circuit switch 32 is connected in parallel to the series circuit comprising the fuse 30 and the battery 31. A control unit 33 detects an impermissibly high current of the battery cell 31 by means of a fault current detection device 34 and in this case actuates the short-circuit switch 32. The power electronics 35 of a motor 36, such as the drive motor of the motor vehicle, is connected in parallel with the short-circuit switch 32. The half bridges of the power electronics 35 described above, potentially comprised by a circuit configuration for feeding the drive motor, can be used alternatively or in addition to producing a short circuit in parallel with the series circuit comprising the fuse and the battery.

In other words, the control unit 33 detects a short circuit or a deviation in general from a difference between the battery current on one side and the DC current draw at the power electronics on the other side. If further consumers are present, said consumers must be considered in the balance in order to detect the fault case. In case of a fault, the short-circuit switch 32 is closed in order to trip the fuse 30 to protect the battery cell 31.

The DC current draw of the power electronics can be measured by means of the current sensor 34. Alternatively, the DC current draw can be calculated without a current sensor. A speed sensor and a torque model are used to calculate the mechanical power. The DC current can be calculated using a loss model for the machine and the power electronics.

FIG. 19 shows a refinement of a protective circuit configuration for tripping a fuse. Said refinement largely corresponds to that of FIG. 18 and is not described here again in this respect. In place of a single series circuit comprising a fuse 30 and a battery cell 31, however, in FIG. 19 a series-parallel circuit comprising a total of four series circuits is provided, each comprising a fuse 30 and a battery cell 31. In the present embodiment example, two each of such series circuits are connected to each other in series and two each are connected in parallel. The passive fuses 30 altogether protect each battery cell 31. The active switch and the control unit, however, need not be provided for each cell and connected in parallel thereto. Current is measured by means of the current sensor 34.

In alternative embodiments, an arbitrary number of the four series circuits shown as examples can be connected in parallel and/or in series.

The battery cells 31 can be cells of a conventional rechargeable battery or cells of a fuel cell or a flow cell battery.

FIGS. 20 through 23 each show an embodiment example of a drive device according to the proposed principle, wherein one conductor arrangement 38 is connected between a rectifier 35 and a battery 37 according to the proposed principle. One drive motor 36 each is provided between the rectifier 35 and a gearbox 39.

FIG. 24 shows a refinement of the circuit board 10' from FIG. 8, but populated by electronic components. A support capacitor 17 is particularly mounted between the positive pole 11 and negative pole 12, each flat in design, said capacitor connecting the two poles to each other across the separating line 16. Two semiconductor power switches 18, 19 are connected between the positive pole 11 and the output connection 14 on one side and between the output connection 14 and the negative pole on the other side. A circuit board connects one reference connection each of the semiconductor power switches 18, 19 to each other.

FIG. 25 shows a refinement of the circuit board 10 from FIG. 7, also populated in contrast to the plate in said figure. Two support capacitors 17 are mounted on the flat positive pole 11 and, not shown here, contact the negative pole. A total of four semiconductor power switches 77 are further connected between the output connection 14 and the positive pole 11. The semiconductor power switches 22 are connected to each other by means of a common circuit board at a common reference potential connection. The negative pole can be connected to the capacitor 17 by means of a hole.

FIG. 26 shows an alternative embodiment of the circuit board from FIG. 24. A flat contact pad is provided on one side and an angled contact pad on the other side for contacting the output connection 14 and said pads can be connected to a bar of the winding to be placed in a slot for contacting the output connection 14 of the circuit board. Two contacting options are thus provided.

For all embodiments according to FIGS. 24 through 26, the potentials between the positive pole, the negative pole, and the output connection are separated by separation point or separation lines 16, 16'.

For the embodiments according to FIGS. 24 through 26, the bottom sides are also each populated by semiconductor switches for interconnecting one or both of the two poles, depending on the implementation.

FIG. 27 shows the embodiment example of the circuit board 10' from FIG. 24 mounted on the axial end face of an electric machine. The output connection 14 is conductively connected to a bar 23. One circuit plate 10' is provided for each bar 23 and is connected to the end face thereof, but for visibility purposes only one single circuit board is shown in FIG. 27. The contact can be produced by means of various methods.

FIGS. 28 through 30 show embodiment examples of contacting a circuit board 10' according to FIG. 24 having two contact rings 24, 25 for connecting all positive poles of all circuit boards to each other and for connecting all negative poles of all circuit boards to each other.

FIG. 28 thereby shows the mounting of the circuit board in the axial direction adjacent to the contact rings, FIG. 29 shows the mounting of the circuit board in the radial direction between the contact rings, and FIG. 30 shows the mounting in the axial and radial direction between the contact rings. Only one circuit board is shown again for better visibility.

FIGS. 31 through 33 each show one embodiment example of a circuit board 10 according to FIG. 25, each mounted by means of contact pads on two contact rings 26, 27 for short-circuiting all positive poles and all negative poles, similar to FIGS. 28 through 30. The circuit boards, however, are not connected directly to the contact rings, but rather by means of contact pads.

FIG. 31 in turn shows the mounting in the axial direction adjacent to the contact rings, FIG. 32 shows the mounting in the radial direction between the contact rings, and FIG. 33 shows the mounting in the axial and radial direction relative to the contact rings 26, 27. Only one circuit board is shown again for better visibility. The contact pads can comprise holes or not, depending on the type of connection.

Figure 1:
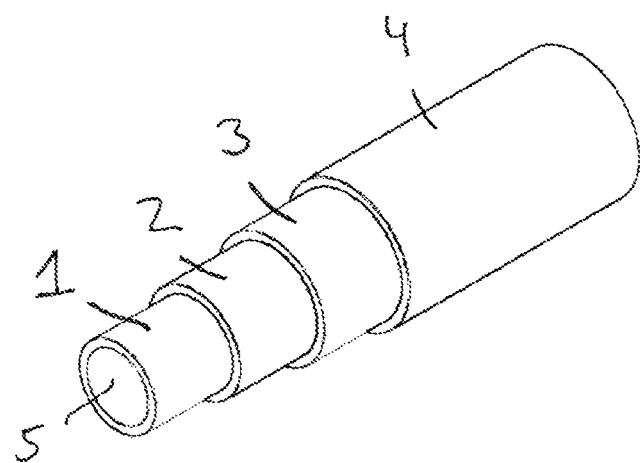
Figure 2:
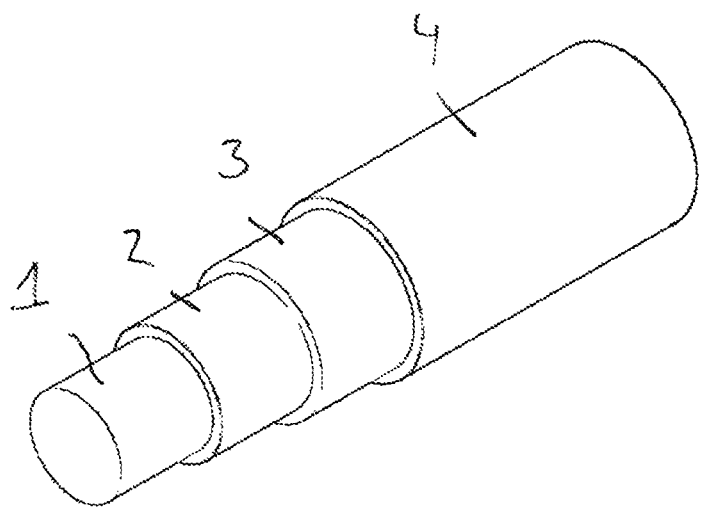
Figure 3:
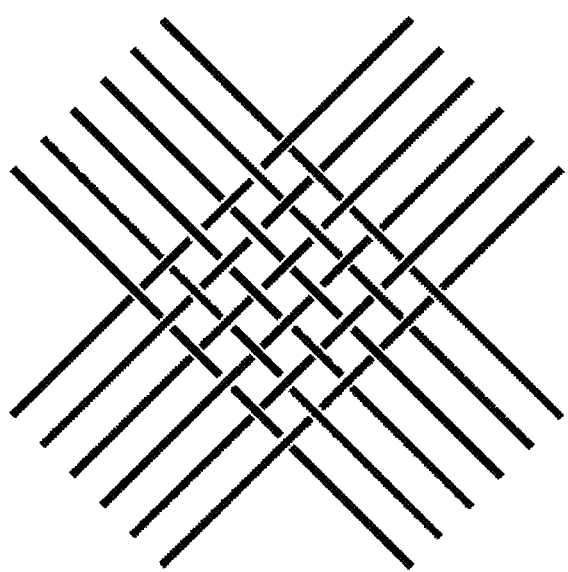
Figure 4:
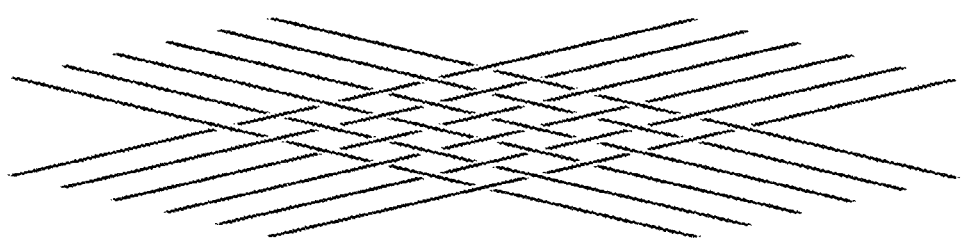
Figure 5:
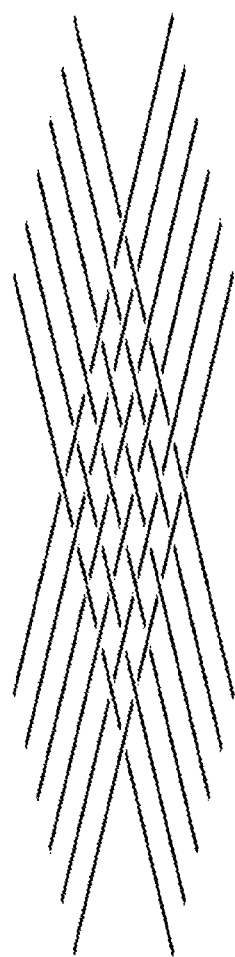
Figure 6:
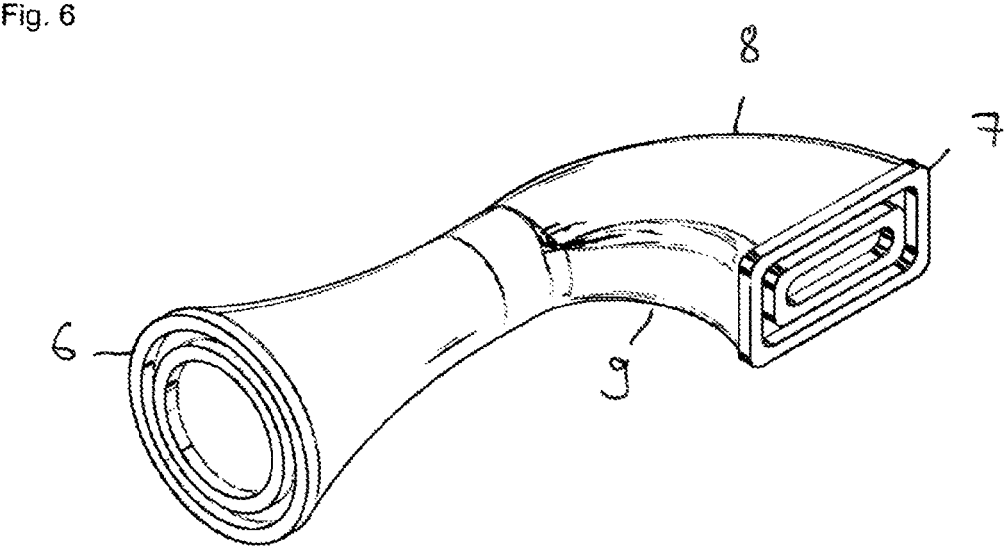
Figure 7:
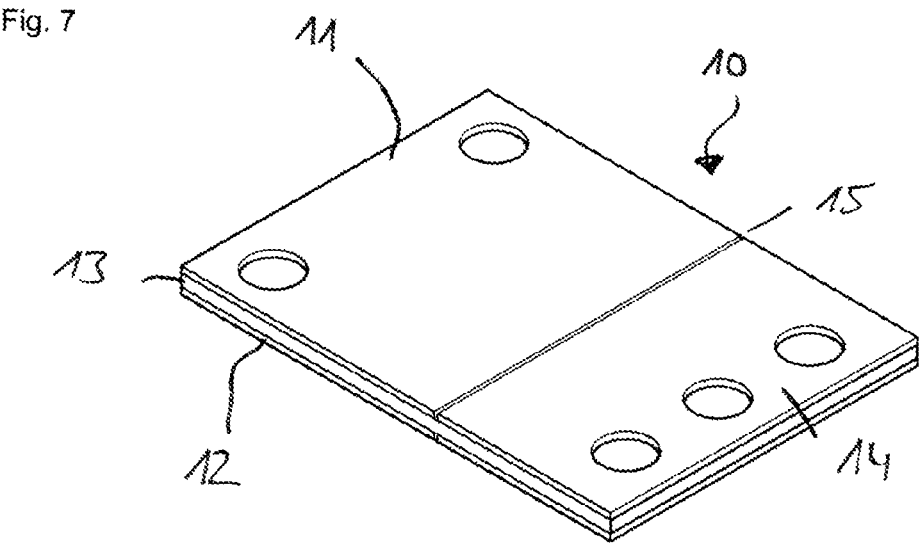
Figure 8:
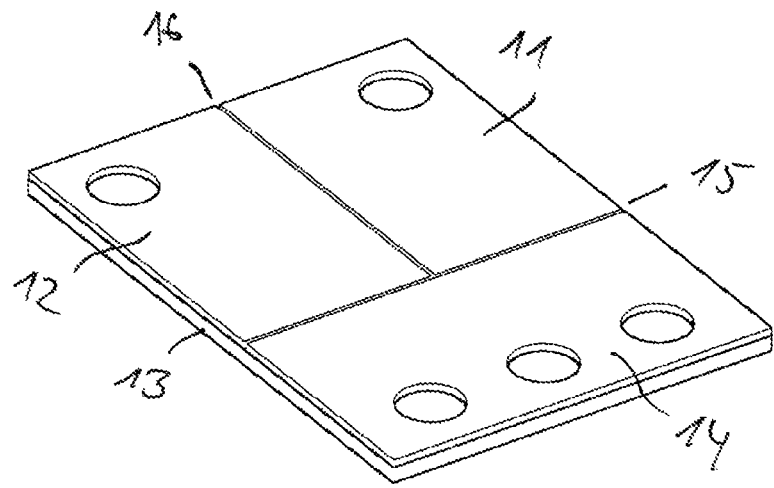
Figure 9:
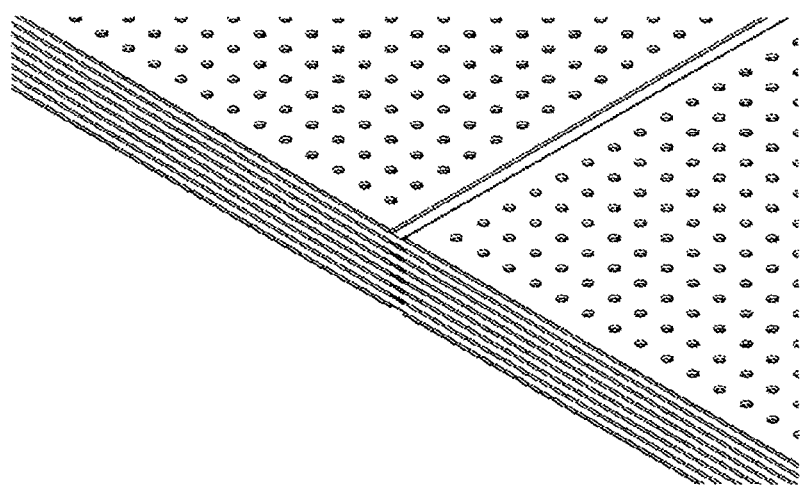
Figure 10:
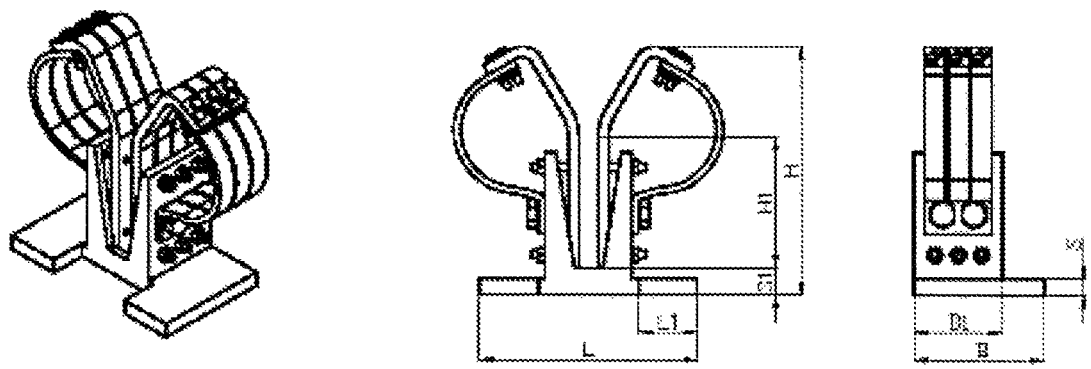
Figure 11:
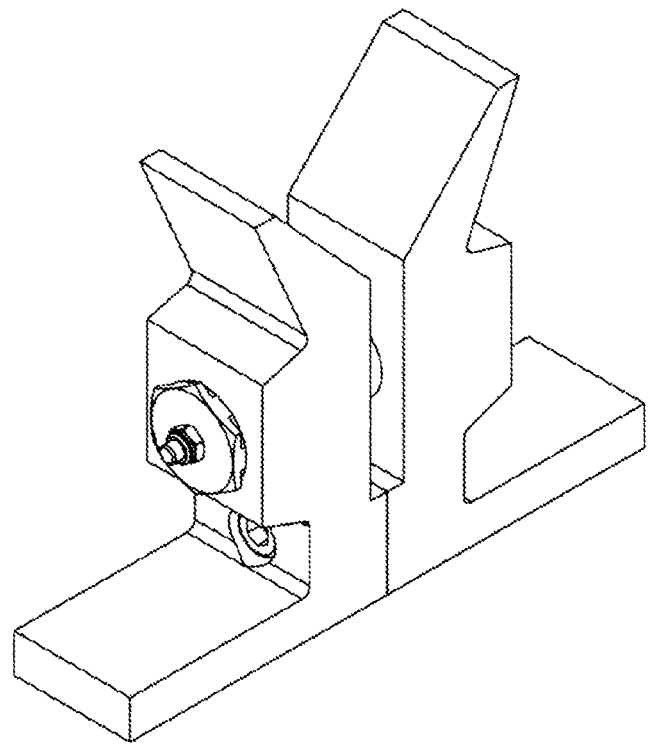
Figure 12:
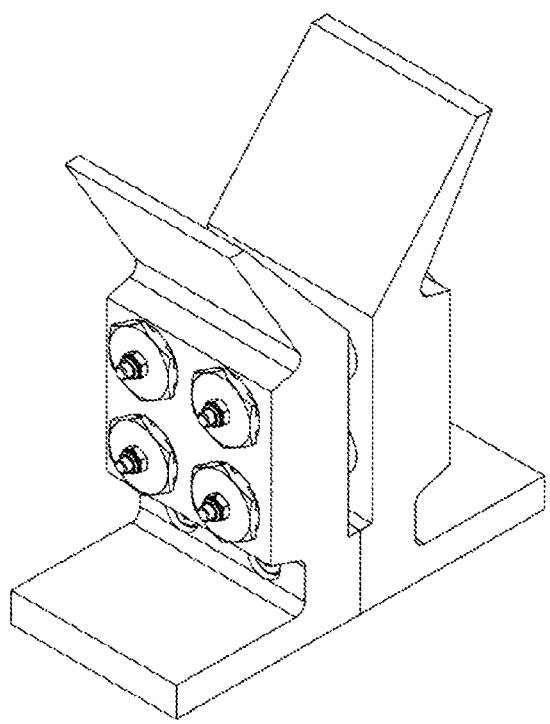
Figure 13:
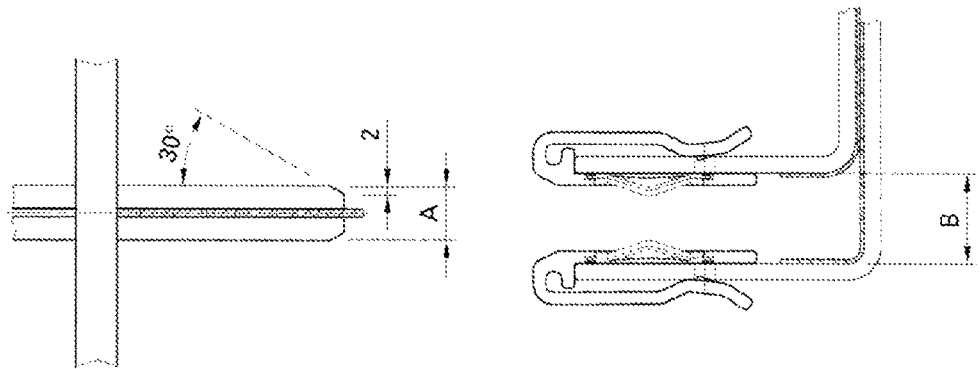
Figure 14:
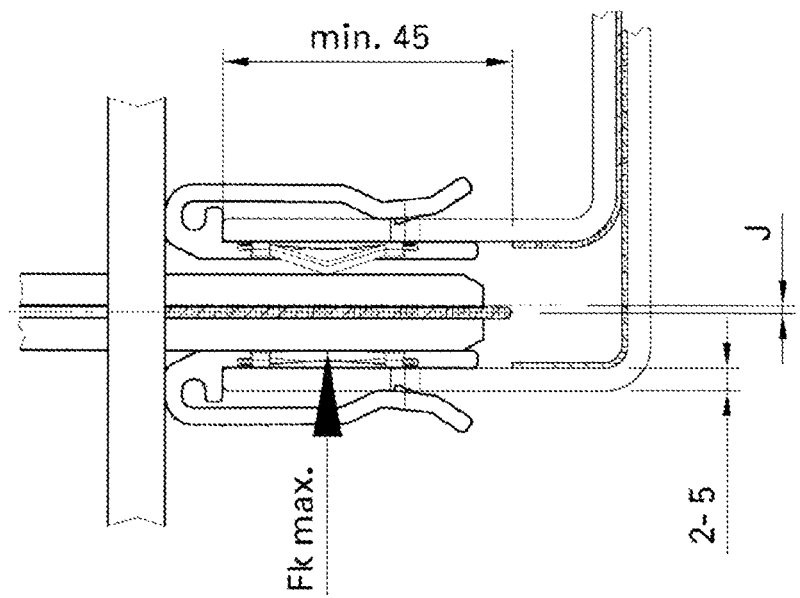
Figure 15:
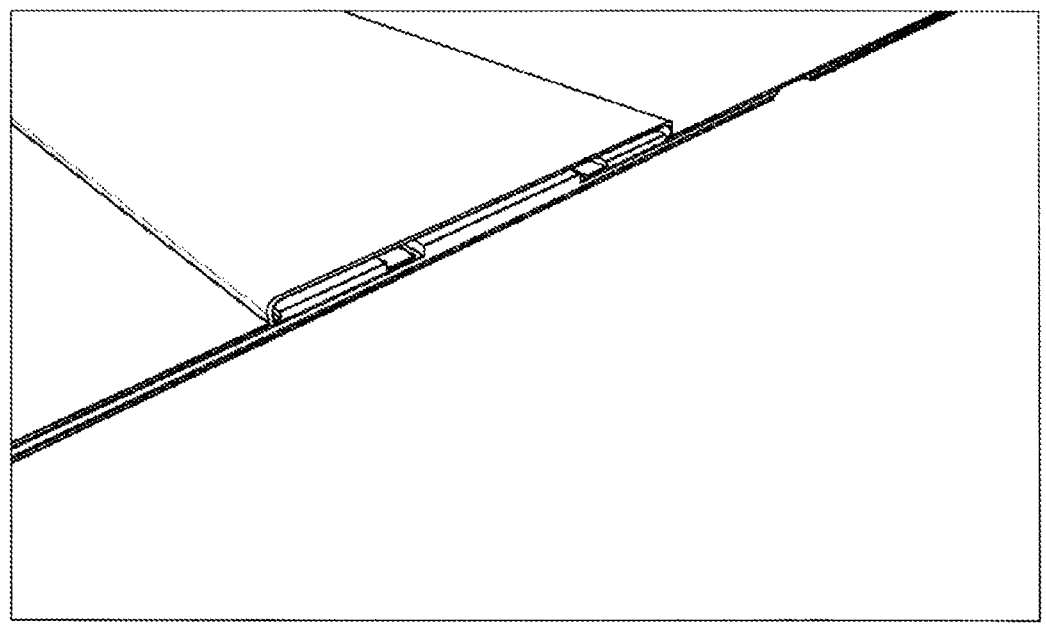
Figure 16:
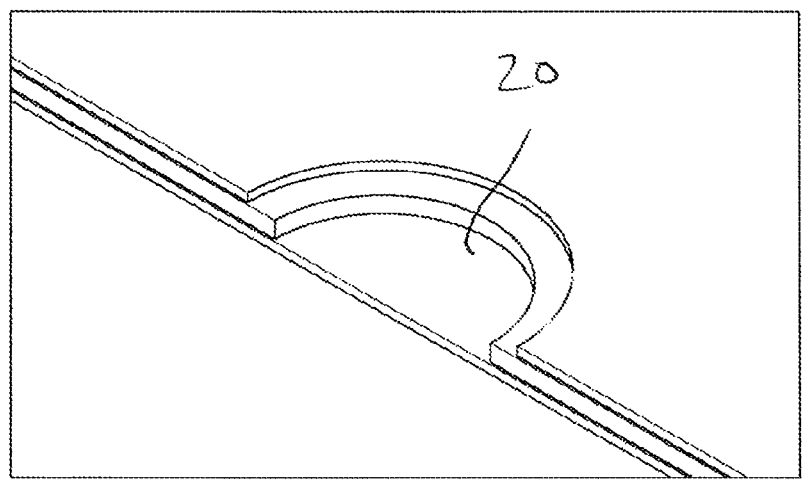
Figure 17:
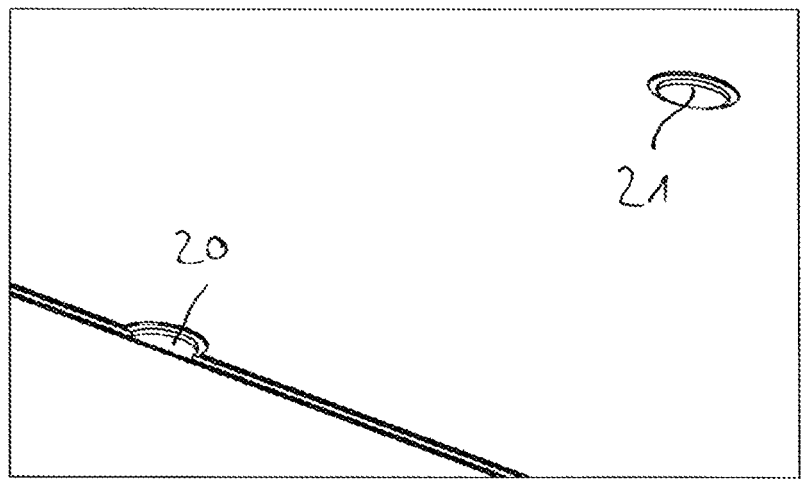
Figure 18:
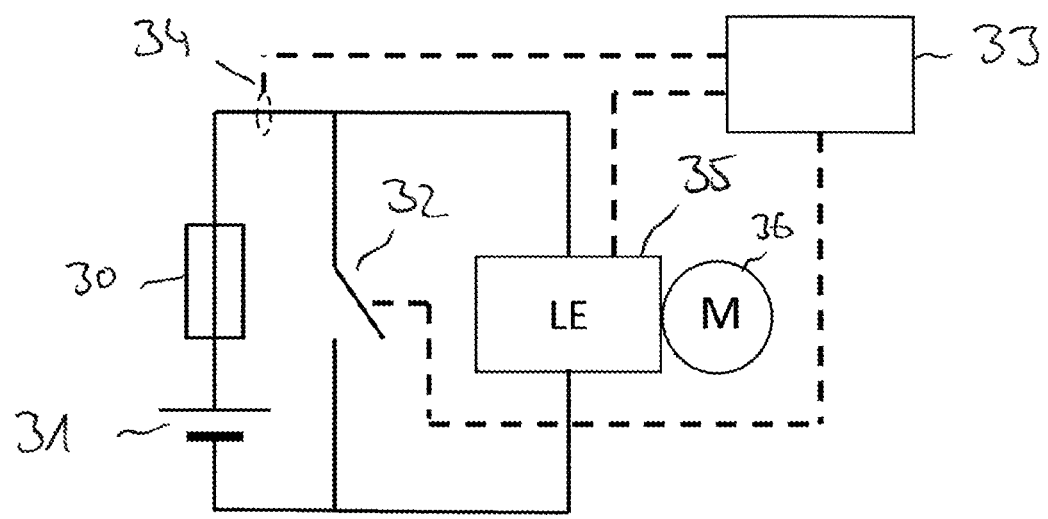
Figure 19:
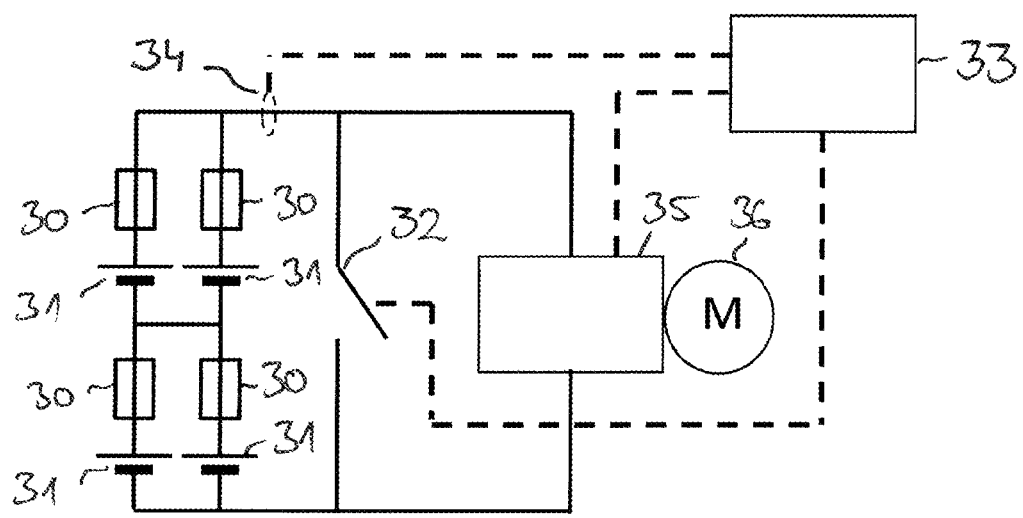
Figure 20:
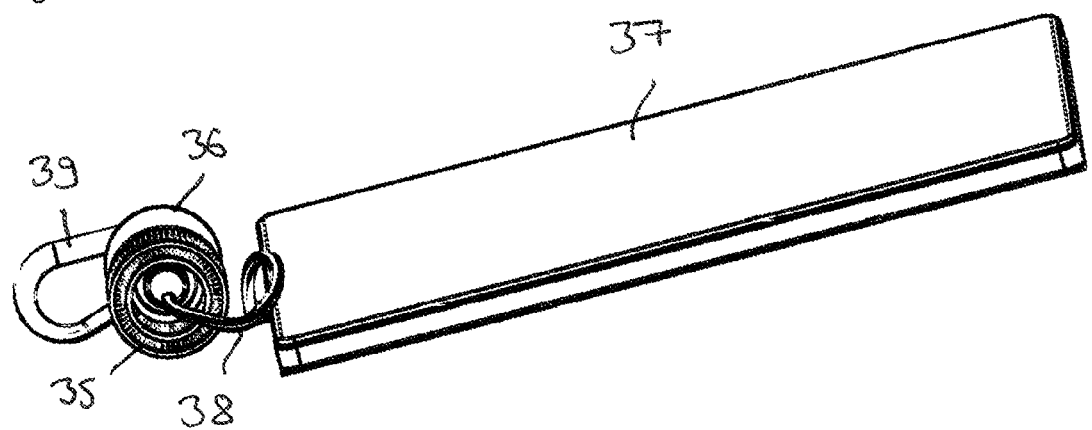
Figure 21:
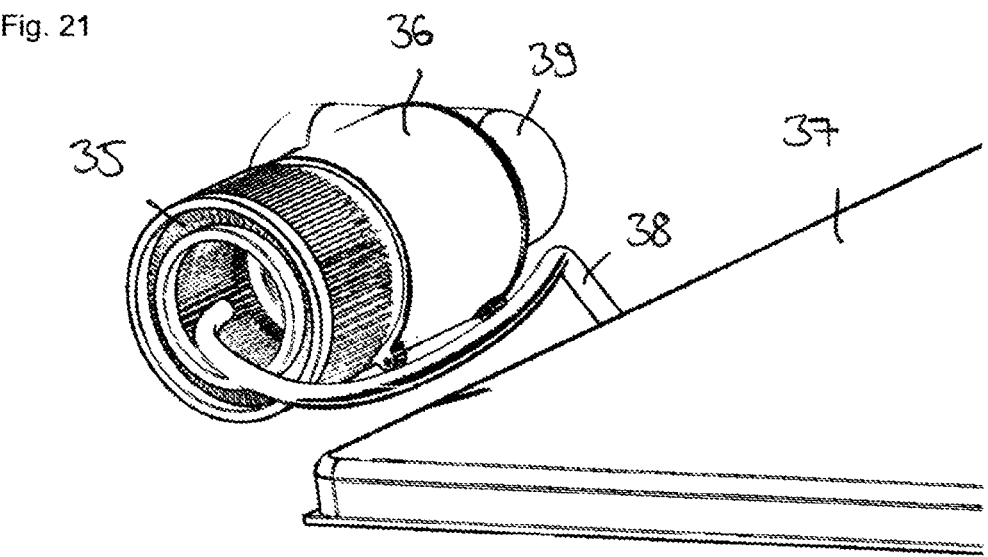
Figure 22:
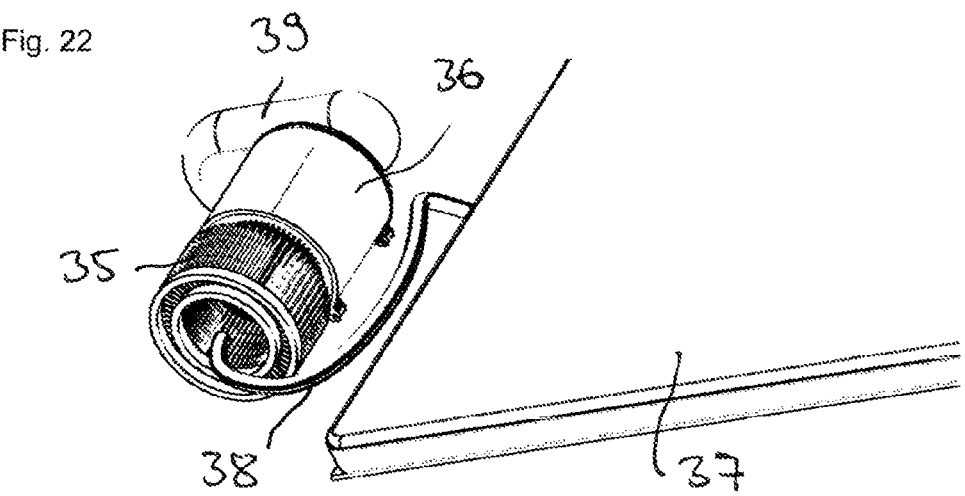
Figure 23:
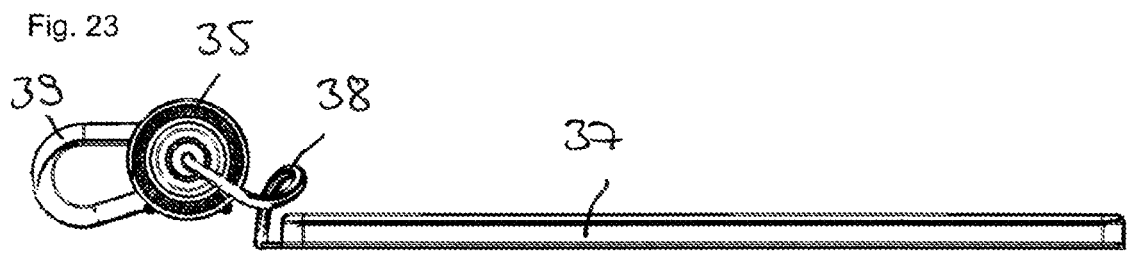
Figure 24:
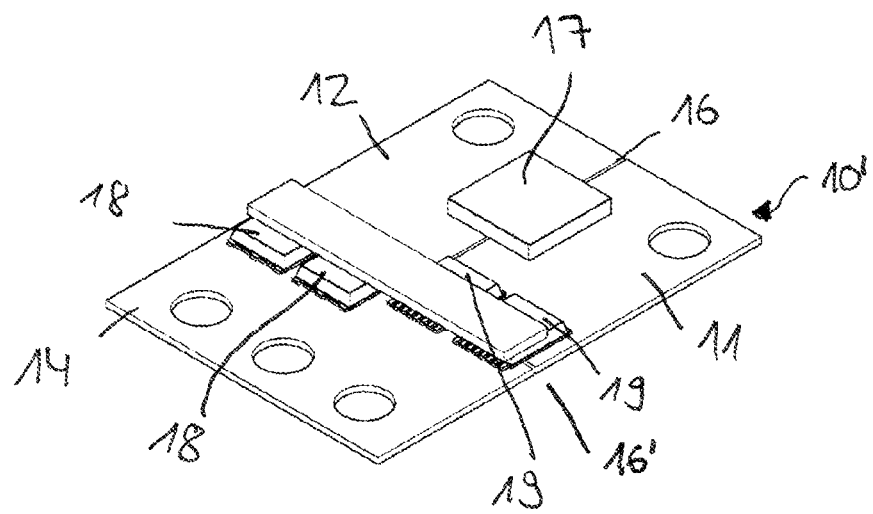
Figure 25:
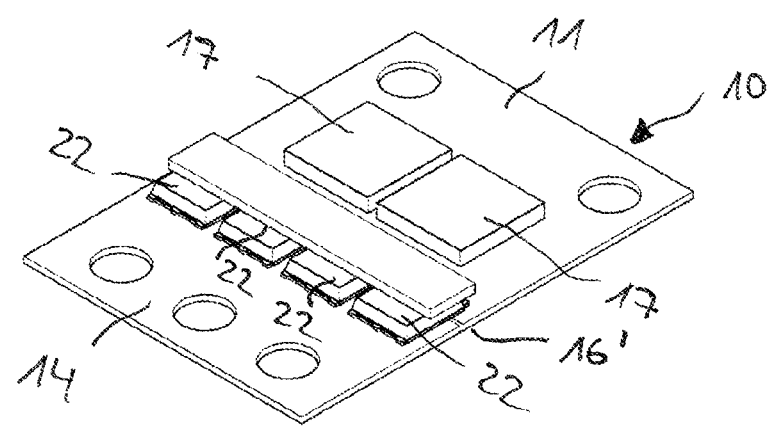
Figure 26:
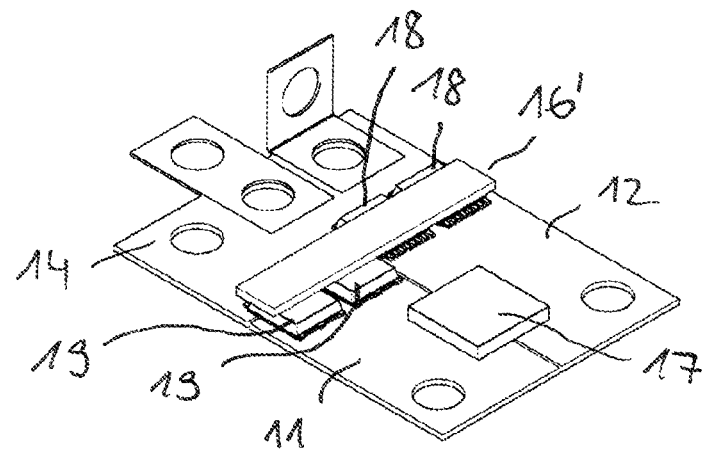
Figure 27:
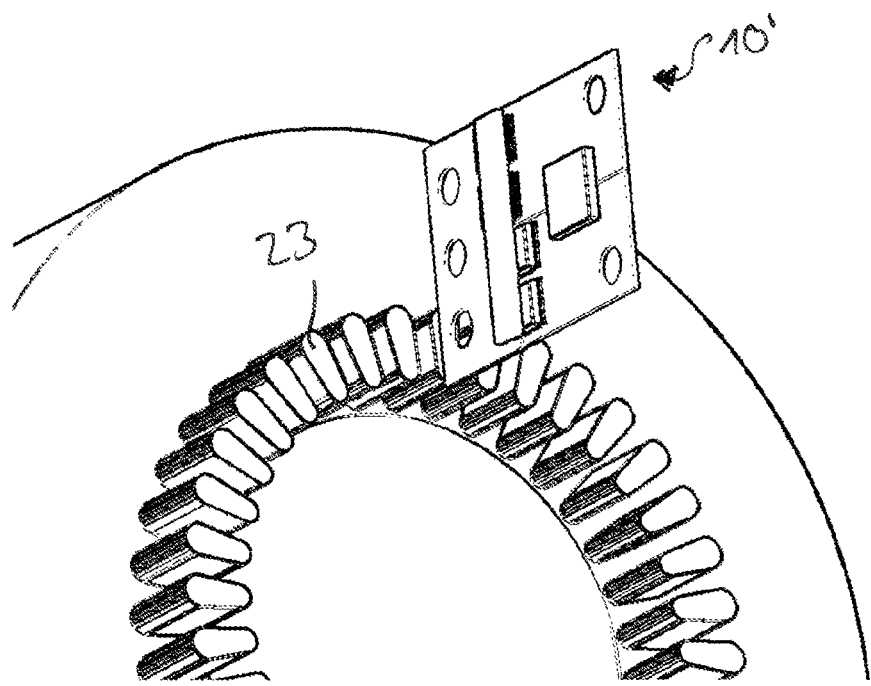
Figure 28:
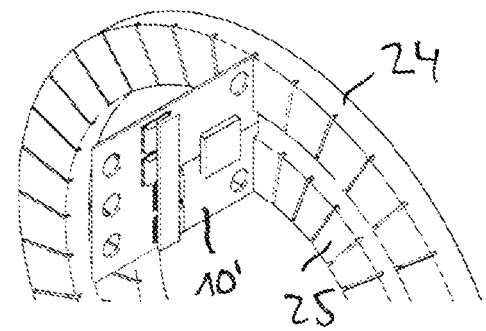
Figure 29:
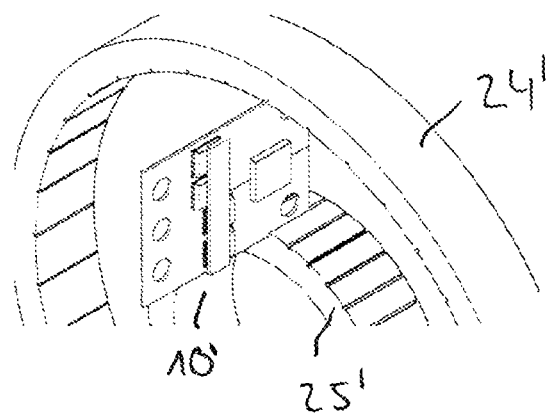
Figure 30:
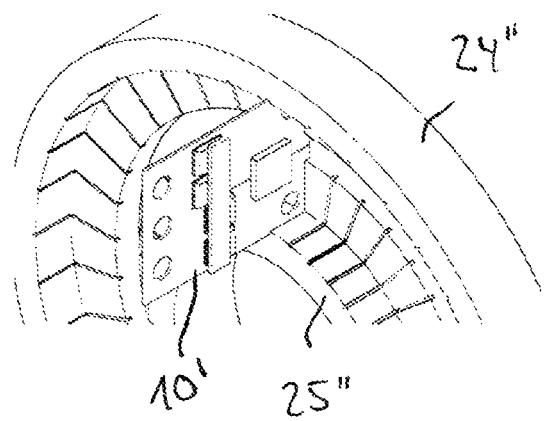
Figure 31:
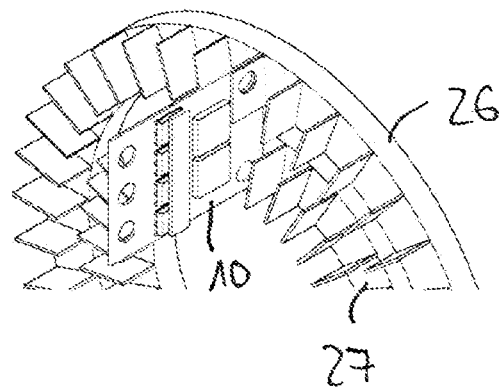
Figure 32:
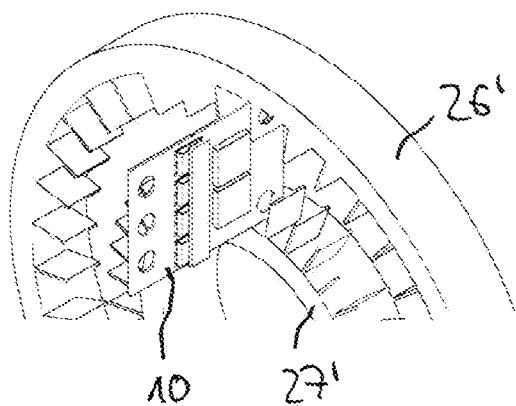
Figure 33:
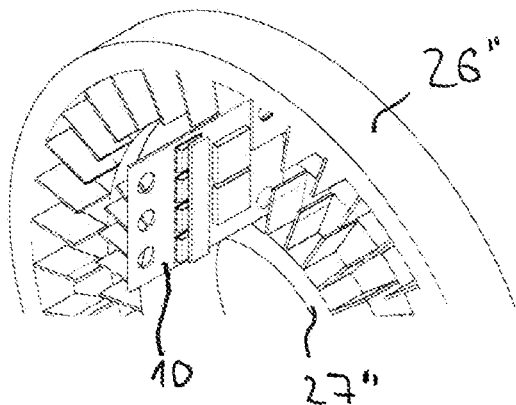
Figure 34:
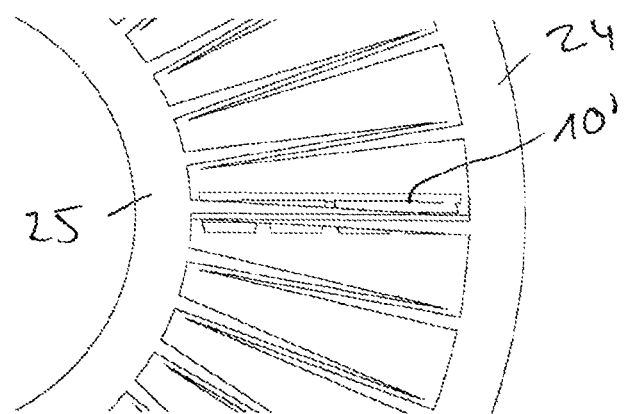
FIG. 34 shows an embodiment example of mounting a circuit board 10' between two contact rings 24, 25 in a detail view of a cross section in the axial direction.
Figure 35:
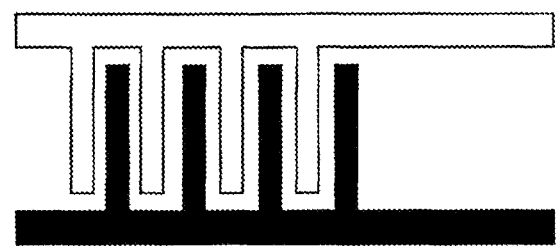
FIG. 35 shows an embodiment example of a base plate of a rechargeable battery having a sandwich structure according to the proposed principle, wherein the two plates each have an interlaced comb structure in order to increase the capacitance of the plate capacitors.

The invention claimed is:
1. A mobile electrical drive device having a conductor arrangement for transmitting electrical energy in a mobile system comprising a land vehicle, aircraft, or watercraft, the conductor arrangement comprising:

an inner conductor; and an outer conductor arranged coaxially thereto, insulated from each other by an insulating layer, wherein the conductor arrangement is configured to electrically connect an electrical energy source to a drive motor for supplying the same with energy, wherein the conductor arrangement is designed for a DC voltage between the inner and outer conductors of less than 1000 volts, wherein the conductor arrangement connects a battery to the drive motor of the drive device, wherein the drive device comprises:
- a circuit configuration for feeding the drive motor implemented as a multiphase electric machine, the circuit configuration comprising a circuit board having one connection each for a positive pole and a negative pole for connecting to an intermediate circuit voltage; and
- at least one semiconductor power switch each mounted on the circuit board and connecting the positive pole and the negative pole to an output connection, forming a half-bridge circuit, wherein the connections for the positive pole and the negative pole and the output connection are each implemented having a flat area such that the connections for the positive pole and the negative pole are disposed adjacent to each other or one above the other relative to a plane of the circuit board and extend flat in axial and radial directions of the drive motor, and wherein the output connection is set up for providing a cycled voltage as an actuating signal for an electrical phase of the machine.

2. The drive device according to claim 1,
wherein the circuit board comprises an electrically insulating board on which the connections for the positive pole and the negative pole and the output connection are mounted.

3. The drive device according to claim 1,
comprising an intermediate circuit capacitor connected between the connection for the positive pole and the connection for the negative pole of the circuit board.

4. The drive device according to claim 1,
wherein one circuit board is provided for actuating each phase of the multiphase electric machine.

5. The drive device according to claim 1,
the drive motor thereof comprising a stator having slots in each of which one electrically conductive bar extending in an axial direction is provided, wherein bars are distributed along a circumference of the stator and wherein each bar is associated with one electrical phase of the drive motor.

6. The drive device according to claim 5,
wherein each circuit board is disposed at an end face on the stator in an axial extension of the associated bar.

7. The drive device according to claim 1,
wherein a contact ring is provided for connecting negative poles of the circuit board to each other and a contact ring is provided for connecting positive poles of the circuit board to each other.

8. The drive device according to claim 1,
wherein the battery comprises an extensive, flat base plate and comprises at least two plates disposed in parallel and electrically separated by an insulator, forming a sandwich structure.

9. The drive device according to claim 8,
wherein the plates comprise at least one comb structure for increasing a capacitance of a capacitor formed by the sandwich structure.

10. The drive device according to claim 8,
wherein the insulator comprises carbon.

11. The drive device according to claim 8,
wherein the battery comprises high-current contacts or busbars for charging the battery and mounted on a base plate of the battery.

12. The drive device according to claim 11,
wherein the high-current contacts or busbars comprise a displaceable cover.

13. The drive device according to claim 1,
comprising a protective circuit arrangement for tripping a fuse, wherein the fuse is connected in series with a battery cell of the battery, the protective circuit arrangement comprising a short-circuit switch connected in parallel to a series circuit comprising the battery and the fuse.

14. The drive device according to claim 13,
wherein the short-circuit switch comprises half bridges implemented for feeding the drive motor, implemented as a multiphase electric machine, such that a direct short circuit or a short circuit across the drive motor is brought about in case of a fault.

15. The drive device according to claim 1, wherein:
the circuit board comprises a flat board;
the flat board comprises a first surface and a second surface opposite to the first surface;
each of the first surface and the second surface is larger than any of side surfaces of the flat board;
the connection for the positive pole is flat, is disposed on one of the first and second surfaces, and is larger than any of the side surfaces of the flat board; and
the connection for the negative pole is flat, is disposed on one of the first and second surfaces, and is larger than any of the side surfaces of the flat board.

16. The drive device according to claim 15, wherein:
the output connection is flat, is disposed on one of the first and second surfaces, and is larger than any of the side surfaces of the flat board; and
the output connection is disposed adjacent to at least one of the connections for the positive and negative poles.

17. The drive device according to claim 15, wherein each of the connections for the positive and negative poles is substantially rectangular in shape.

18. The drive device according to claim 1, wherein:
the connection for the positive pole comprises a first flat plate;
the connection for the negative pole comprises a second flat plate; and
the first flat plate and the second flat plate are disposed adjacent to each other or one above the other.

19. The drive device according to claim 18, wherein:
the output connection comprises a third flat plate; and
the third flat plate is disposed adjacent to at least one of the first and second flat plates.

* * * * *